May 11, 1926.
J. F. JOUBERT
PRESSING MACHINE
Filed Dec. 1, 1924
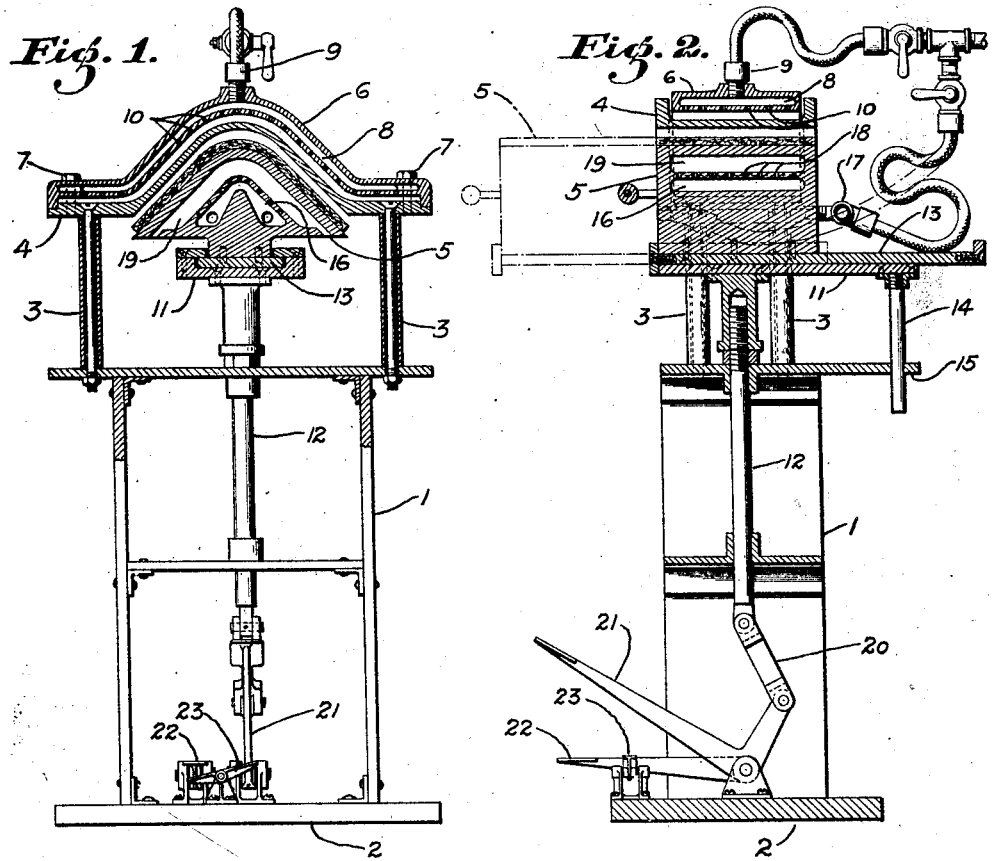
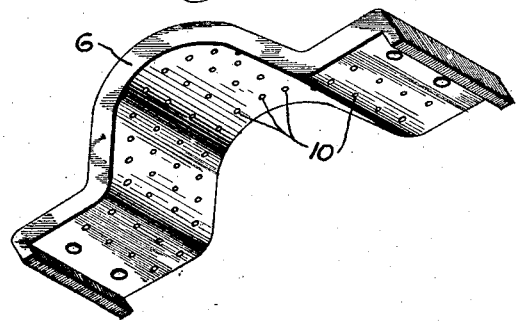
Inventor
Joseph F. Joubert.
By Dewey, Strong, Townsend & Loftus
Attorneys.

Patented May 11, 1926.

1,584,229

UNITED STATES PATENT OFFICE.

JOSEPH F. JOUBERT, OF SAN FRANCISCO, CALIFORNIA.

PRESSING MACHINE.

Application filed December 1, 1924. Serial No. 753,181.

This invention relates to pressing machines, and particularly to a machine for pressing collars. I am aware that various similar machines have been provided for performing this function. The object of my invention is to provide a manually operated machine in which is embodied various improvements over the machines now known and in use.

With the above and other objects in view, my invention consists of the features of construction and operation set forth in the following specification and illustrated in the accompanying drawing. In such drawing, annexed hereto and forming a part of this specification, I have illustrated certain specific embodiments of my invention, but it will be understood that the invention can be otherwise embodied, and that the drawing is not to be construed as defining or limiting the scope of the invention, the claims appended to this specification being relied upon for that purpose.

Referring to the figures of the drawing, Fig. 1 is a vertical sectional view through my improved presser;

Fig. 2 is a similar view at right angles to Fig. 1;

Fig. 3 is an enlarged perspective view of a detail.

In the drawing, 1 indicates the frame of my pressing machine mounted on a base 2. Supported rigidly by posts 3 on the top of the frame is an upper stationary pressing element 4. The central portion of this element is U-shaped, to receive the vertically movable and co-operating pressing element 5 therein.

The top of the element 4 is channeled to receive a removable cover 6 which may be secured to the element by screws 7. This cover has a gas-chamber 8 therein. Gas is supplied to the chamber at 9, and the inner wall is perforated at 10 to provide a gas burner for heating the pressing element 4.

The lower pressing element 5 is supported on a platform 11 carried on the upper end of a vertically movable rod 12. This platform presents a broad supporting surface or guide-way which co-operates with a co-operating surface 13, for supporting the element 5 for horizontal sliding movement on the platform. The platform extends considerably beyond the frame 1 at one side thereof, and carries a guiding post 14 at its outer end, in sliding engagement with an extended portion 15 of the frame. This post co-operates with the rod 12 to rigidly support the platform against other than its vertical movement. The element 5 is adapted to be moved horizontally from the pressing position to the loading position, as shown in dot-and-dash lines in Fig. 2.

The pressing element 5 is also adapted to be gas-heated. For this purpose the element 5 is provided with a gas chamber 16 therein. Gas is supplied to this chamber at 17, and passes through perforations 18 into the burning chamber 19.

The rod 12 and movable pressing element 5 are moved vertically into pressing position by a toggle joint 20, operated by a foot-lever 21. The lever 21 is adapted to be released by a second lever 22 and a pivoted element 23 extending beneath both levers.

It is believed that the operations and advantages of my improved pressing machine will be understood without further description herein.

What I claim and desire to secure by Letters Patent is:

1. A pressing machine comprising the combination of an upper pressing element having a lower pressing surface and an upper heating surface, means removably mounted on the element over the upper surface and having a chamber therein, a gas connection to the chamber, the lower wall of the chamber being perforated into the chamber and spaced from the said upper surface whereby flame jets are provided to heat the pressing element, a lower pressing element cooperating with the upper pressing element and having a heating chamber therein, gas connections to and from the chamber for heating the upper pressing surface of the lower pressing element, and means for moving one of the pressing elements vertically to cooperate with the other pressing element.

2. A pressing machine comprising the combination of a stationary pressing element having a U-shaped socket in its under side, a movable cooperating pressing element having a projecting portion movable into and out of the socket, the stationary pressing element having a U-shaped socket in its upper side, a removable cover for the upper socket having a chamber therein and perforations leading outwardly therefrom toward the pressing element, gas connections to the chamber, and means for spacing the inner perforated surface of the cover from the outer and cooperating surface of the upper pressing element.

JOSEPH F. JOUBERT.